United States Patent
Watanabe et al.

(10) Patent No.: US 10,352,728 B2
(45) Date of Patent: Jul. 16, 2019

(54) ANGLE SENSOR, CORRECTION METHOD FOR USE THEREWITH, AND ANGLE SENSOR SYSTEM

(71) Applicant: TDK CORPORATION, Tokyo (JP)

(72) Inventors: Kazuya Watanabe, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 157 days.

(21) Appl. No.: 15/602,808

(22) Filed: May 23, 2017

(65) Prior Publication Data
US 2017/0350726 A1   Dec. 7, 2017

(30) Foreign Application Priority Data
Jun. 1, 2016   (JP) ................................. 2016-109711

(51) Int. Cl.
| | | |
|---|---|---|
| *G01D 5/16* | (2006.01) | |
| *G01D 5/165* | (2006.01) | |
| *G01D 18/00* | (2006.01) | |
| *G01D 5/14* | (2006.01) | |
| *G01D 5/244* | (2006.01) | |

(52) U.S. Cl.
CPC ........... *G01D 5/1655* (2013.01); *G01D 5/145* (2013.01); *G01D 5/2448* (2013.01); *G01D 18/00* (2013.01)

(58) Field of Classification Search
CPC ....... G01D 5/145; G01D 5/16; G01D 5/24476
See application file for complete search history.

(56) References Cited

U.S. PATENT DOCUMENTS

| | | | | |
|---|---|---|---|---|
| 7,486,756 B2* | 2/2009 | Tsai | ..................... | H03D 13/004 327/525 |
| 2011/0031965 A1* | 2/2011 | Saruki | .................... | G01D 3/036 324/207.25 |
| 2012/0095712 A1* | 4/2012 | Komasaki | .............. | G01D 3/036 702/94 |
| 2014/0300306 A1 | 10/2014 | Kato | | |

FOREIGN PATENT DOCUMENTS

JP   2008-043183 A   2/2008

* cited by examiner

*Primary Examiner* — Jermele M Hollington
*Assistant Examiner* — Alvaro E Fortich
(74) *Attorney, Agent, or Firm* — Oliff PLC

(57) ABSTRACT

An angle sensor includes a detection signal generation unit for generating detection signals, and an angle detection unit for generating a detected angle value on the basis of the detection signals. The angle detection unit includes a signal conversion unit for performing a conversion operation, and an angle operation unit for performing an angle operation. The conversion operation is to convert the detection signals into first and second operation signals. The angle operation is to calculate the detected angle value using the first and second operation signals. The conversion operation includes an operation using a correction-term-containing function which contains a correction term for reducing a first error or a second error occurring in the detected angle value. When the angle to be detected varies with a predetermined period, the first error varies with the predetermined period, whereas the second error varies with a period ½ the predetermined period.

19 Claims, 11 Drawing Sheets

ANGLE SENSOR, CORRECTION METHOD FOR USE THEREWITH, AND ANGLE SENSOR SYSTEM

BACKGROUND OF THE INVENTION

1. Field of the Invention

The present invention relates to an angle sensor and an angle sensor system for generating a detected angle value having a correspondence with an angle to be detected, and to a correction method for correcting an error of the angle sensor.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. A system using the magnetic angle sensor is typically provided with a magnetic field generation unit for generating a rotating magnetic field whose direction rotates in response to the rotation or linear movement of an object. The magnetic field generation unit is a magnet, for example. The angle to be detected by the magnetic angle sensor is, for example, the angle that the direction of the rotating magnetic field in a reference position forms with respect to a reference direction.

Among known magnetic angle sensors is one that includes a detection signal generation unit for generating first and second detection signals 90° different in phase from each other and generates the detected angle value by performing an operation using the first and second detection signals. The detection signal generation unit includes a first detection circuit for outputting the first detection signal, and a second detection circuit for outputting the second detection signal. Each of the first and second detection circuits includes at least one magnetic detection element. The magnetic detection element includes, for example, a spin-valve magnetoresistance (MR) element including a magnetization pinned layer whose magnetization direction is pinned, a free layer whose magnetization direction varies depending on the direction of the rotating magnetic field, and a nonmagnetic layer located between the magnetization pinned layer and the free layer.

For the magnetic angle sensors, ideally, the first and second detection signals each have a waveform of a sinusoidal curve (including a sine waveform and a cosine waveform) when the direction of the rotating magnetic field changes with a constant angular velocity and the angle to he detected varies with a predetermined period. However, there are cases where the waveform of each detection signal is distorted from a sinusoidal curve. In such cases, the first detection signal contains a first ideal component which varies in such a manner as to trace an ideal sinusoidal curve and an error component other than the first ideal component, and the second detection signal contains a second ideal component which varies in such a manner as to trace an ideal sinusoidal curve and an error component other than the second ideal component. A distortion of the waveform of each detection signal may result in some error in the detected angle value. The error occurring in the detected angle value will hereinafter be referred to as angular error.

JP 2008-043183 A describes a technique to apply offset correction and gain correction to output signals of a magnetic sensor.

In the angle sensors, general correction such as offset correction and gain correction is conventionally applied to each detection signal. However, when each detection signal in the angle sensor has a distorted waveform, an angular error may occur even with the application of the aforementioned general correction. When the angle to be detected varies with a predetermined period, the angular error includes, for example, an error that varies with the same period as the predetermined period, and an error that varies with a period of ½ the predetermined period. Hereinafter, the former error will be referred to as the first-order error, and the latter as the second-order error.

To reduce the first-order error and the second-order error in the angle sensor, a method is conceivable in which each detection signal is corrected so as to have a less distorted waveform. Disadvantageously, however, such a method involves complicated operation.

SUMMARY OF THE INVENTION

It is an object of the present invention to provide an angle sensor, a correction method for use therewith, and an angle sensor system that enable reduction of an angular error with a simple operation.

An angle sensor of the present invention includes a detection signal generation unit for generating a plurality of detection signals each having a correspondence with an angle. to be detected, and an angle detection unit for generating a detected angle value on the basis of the plurality of detection signals, the detected angle value having a correspondence with the angle to be detected. A correction method of the present invention is for use with an angle sensor that includes the aforementioned detection signal generation unit and the aforementioned angle detection unit.

The angle detection unit includes a signal conversion unit for performing a conversion operation to convert the plurality of detection signals into a first operation signal and a second operation signal to be used in an angle operation to calculate the detected angle value, and an angle operation unit for performing the angle operation using the first and second operation signals. The conversion operation includes an operation using at least one correction-term-containing function which contains a correction term for reducing a first error or a second error occurring in the detected angle value. The first error and the second error are errors that vary with a first period and a second period, respectively, when the angle to be detected varies with a predetermined period. The first period is equal to the predetermined period, and the second period is ½ the predetermined period.

A correction method for use with an angle sensor of the present invention includes a correction term determination procedure to determine the correction term to be contained in the at least one correction-term-containing function, and a conversion operation procedure to perform the conversion operation by application of the correction term determined by the correction term determination procedure so as to reduce at least one of the first error and the second error. The correction term determination procedure determines the correction term on the basis of at least one of the first error and the second error that occur in the detected angle value as a result of performing an operation using at least one function that is identical with the correction-term-containing function except for not containing the correction term, instead of the operation using the at least one correction-term-containing function.

In the angle sensor and the correction method for use therewith of the present invention, the at least one correction-term-containing function may include at least one offset correction function to apply offset correction to at least one of the plurality of detection signals. In such a case, the correction term contained in the at least one offset correction function may be intended for reducing the first error.

In the angle sensor and the correction method for use therewith of the present invention, the at least one correction-term-containing function may include at least one amplitude correction function to apply amplitude correction to at least one of the plurality of detection signals. In such a case, the correction term contained in the at least one amplitude correction function may be intended for reducing the second error.

In the angle sensor and the correction method for use therewith of the present invention, the conversion operation may include an operation for generating a first initial operation signal and a second initial operation signal on the basis of the plurality of detection signals, aid a normalization operation for normalizing the amplitudes of the first initial operation signal and the second initial operation signal so as to make the first initial operation signal and the second initial operation signal into the first operation signal and the second operation signal, respectively. When the angle to be detected varies with a predetermined period, the first operation signal may contain a first ideal component and a first error component other than the first ideal component, while the second operation signal may contain a second ideal component and a second error component other than the second ideal component. The first ideal component and the second ideal component vary periodically in such a manner as to trace an ideal sinusoidal curve. The at least one correction-term-containing function may include at least one normalization function to be used in the normalization operation to correct the amplitude of at least one of the first initial operation signal and the second initial operation signal. In such a case, the correction term contained in the at least one normalization function may be intended for reducing the second error.

In the angle sensor and the correction method for use therewith of the present invention, the first error may contain a first component and a second component. The first component and the second component may have a phase difference equivalent to ¼ the first period. In such a case, the at least one correction-term-containing function may include a first correction-term-containing function which contains a first correction term for reducing the first component, and a second correction-term-containing function which contains a second correction term for reducing the second component. In such a case, in the correction method of the present invention, the correction term determination procedure may determine the first and second correction terms on the basis of the amplitude and phase of the first error that occurs in the detected angle value as a result of performing an operation using a function that is identical with the first correction-term-containing function except for not containing the first correction term and an operation using a function that is identical with the second correction-term-containing function except for not containing the second correction term, instead of an operation using the first correction-term-containing function and an operation using the second correction-term-containing function.

In the angle sensor and the correction method for use therewith of the present invention, the second error may contain a third component and a fourth component. The third component and the fourth component may have a phase difference equivalent to ¼ the second period. In such a case, the at least one correction-term-containing function may include a third correction-term-containing function which contains a third correction term for reducing the third component, and a fourth correction-term-containing function which contains a fourth correction term for reducing the fourth component. In such a case, in the correction method of the present invention, the correction term determination procedure may determine the third and fourth correction terms on the basis of the amplitude and phase of the second error that occurs in the detected angle value as a result of performing an operation using a function that is identical with the third correction-term-containing function except for not containing the third correction term and an operation using a function that is identical with the fourth correction-term-containing function except for not containing the fourth correction term, instead of an operation using the third correction-term-containing function and an operation using the fourth correction-term-containing function.

In the angle sensor and the correction method for use therewith of the present invention, the angle to be detected may be an angle that the direction of a magnetic field in a reference position forms with respect to a reference direction.

An angle sensor system of the present invention includes the angle sensor of the present invention and a physical information generation unit. The physical information generation unit generates physical information having a correspondence with an angle to be detected. The detection signal generation unit of the angle sensor is configured to detect the physical information to generate the plurality of detection signal.

In the angle sensor system of the present invention, the physical information generation unit may be a magnetic field generation unit for generating a magnetic field as physical information. In such a case, the angle to be detected may be an angle that the direction of the magnetic field in a reference position forms with respect to a reference direction.

In the angle sensor system of the present invention, the physical information generation unit may be configured to change its relative position with respect to the angle sensor so that the angle to be detected changes. The relative position of the physical information generation unit with respect to the angle sensor may change in such a way as to rotate about a central axis. Alternatively, the relative position of the physical information generation unit with respect to the angle sensor may change in a linear fashion.

According to the present invention, the conversion operation for converting the plurality of detection signals into the first and second operation signals includes an operation using at least one correction-term-containing function which contains a correction term for reducing the first error or the second error occurring in the detected angle value. By virtue of this, the present invention enables reduction of the angular error with a simple operation.

Other and further objects, features and advantages of the present invention will appear more fully from the following description.

DETAILED DESCRIPTION OF THE PREFERRED EMBODIMENTS

[First Embodiment]

Preferred embodiments of the present invention will now be described in detail with reference to the drawings. First, reference is made to FIG. 1 to describe the general configuration of an angle sensor system according to a first embodiment of the invention. The angle sensor system according to the first embodiment includes an angle sensor 1 according to the first embodiment and a physical information generation unit 4.

Figure 1:
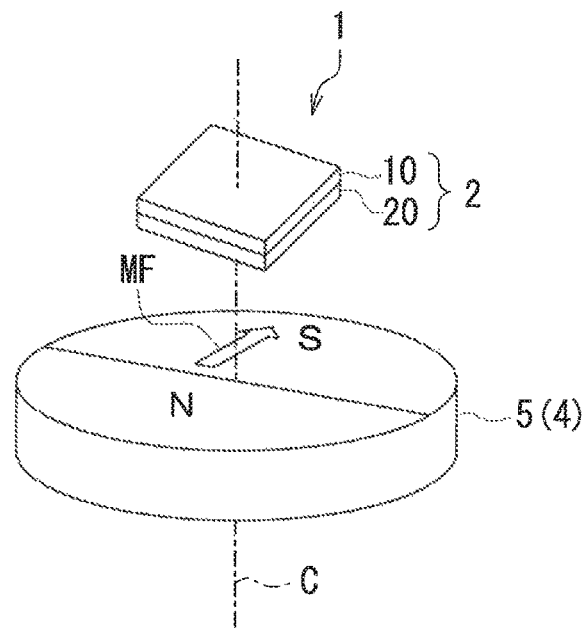
FIG. 1 is a perspective view illustrating the general configuration of an angle sensor system according to a first embodiment of the invention.

The angle sensor 1 according to the first embodiment is configured to generate a detected angle value θs having a correspondence with an angle θ to be detected. The physical information generation unit 4 is configured to generate physical information having a correspondence with the angle θ to be detected. The physical information generation unit 4 is configured to change its relative position with respect to the angle sensor 1 so that the angle θ to be detected changes. The angle sensor 1 according to the present embodiment is particularly a magnetic angle sensor. The physical information generation unit 4 of the present embodiment is particularly a magnetic field generation unit for generating a magnetic field MF as physical information. FIG. 1 shows a magnet 5 of a cylindrical shape as an example of the magnetic field generation unit. The magnet 5 has an N pole and an S pole that are arranged symmetrically with respect to an imaginary plane including the central axis of the cylindrical shape.

The angle sensor 1 according to the present embodiment detects the magnetic field MF generated by the magnet 5. The relative position of the magnet 5 with respect to the angle sensor 1 changes in such a way as to rotate about the central axis C. This is accomplished by a rotation of either one of the angle sensor 1 and the magnet 5 about the predetermined central axis C in response to a rotational movement of a moving object (not illustrated). Alternatively, the magnet 5 and the angle sensor 1 may rotate in mutually opposite directions, or may rotate in the same direction with mutually different angular velocities. The direction of the magnetic field MF to be detected by the angle sensor 1 rotates about the central axis C with changes in the relative position of the magnet 5 with respect to the angle sensor 1.

The angle θ to be detected is an angle that the direction of the magnetic field MF in a reference position forms with respect to a reference direction. The reference position is located within an imaginary plane parallel to an end face of the magnet 5. This imaginary plane will hereinafter be referred to as the reference plane. In the reference plane, the direction of the magnetic field MF generated by the magnet 5 rotates about the reference position. The reference direction is located within the reference plane and intersects the reference position. In the following description, the direction of the magnetic field MF in the reference position refers to a direction located within the reference plane. The angle sensor 1 is placed to face the aforementioned end face of the magnet 5. As will be described later in relation to another embodiment, the magnetic field generation unit is not limited to the magnet 5 shown in FIG. 1.

The angle sensor 1 includes a detection signal generation unit 2 for generating a plurality of detection signals each having a correspondence with the angle θ to be detected. The detection signal generation unit 2 detects the magnetic field MF as physical information to generate the plurality of signals. In the present embodiment, the detection signal generation unit 2 generates a first detection signal and a second detection signal as the plurality of detection signals. In this case, the detection signal generation unit 2 includes a first detection circuit 10 for generating the first detection signal and a second detection circuit 20 for generating the second detection signal. For ease of understanding, FIG. 1 illustrates the first and second detection circuits 10 and 20 as separate components. However, the first and second detection circuits 10 and 20 may be integrated into a single component. Further, while in FIG. 1 the first and second detection circuits 10 and 20 are stacked in a direction parallel to the central axis C, the order of stacking may be inversed from that shown in FIG. 1. Each of the first and second detection circuits 10 and 20 includes at least one magnetic detection element for detecting the magnetic field MF.

Figure 2:
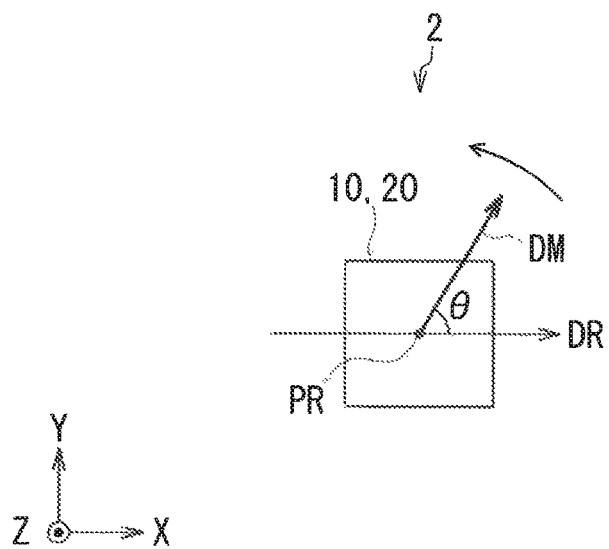
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the central axis C shown in FIG. 1 and from bottom to top in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The reference position PR is the position where the angle sensor 1 detects the magnetic field MF. Assume that the reference direction DR is the X direction. As mentioned above, the angle θ to be detected is an angle that the direction DM of the magnetic field MF in the reference position PR forms with respect to the reference direction DR. Assume that the direction DM of the magnetic field MF rotates counterclockwise in FIG. 2. The angle θ will be expressed in positive values when seen counterclockwise from the reference direction DR, and in negative values when seen clockwise from the reference direction DR.

Figure 3:
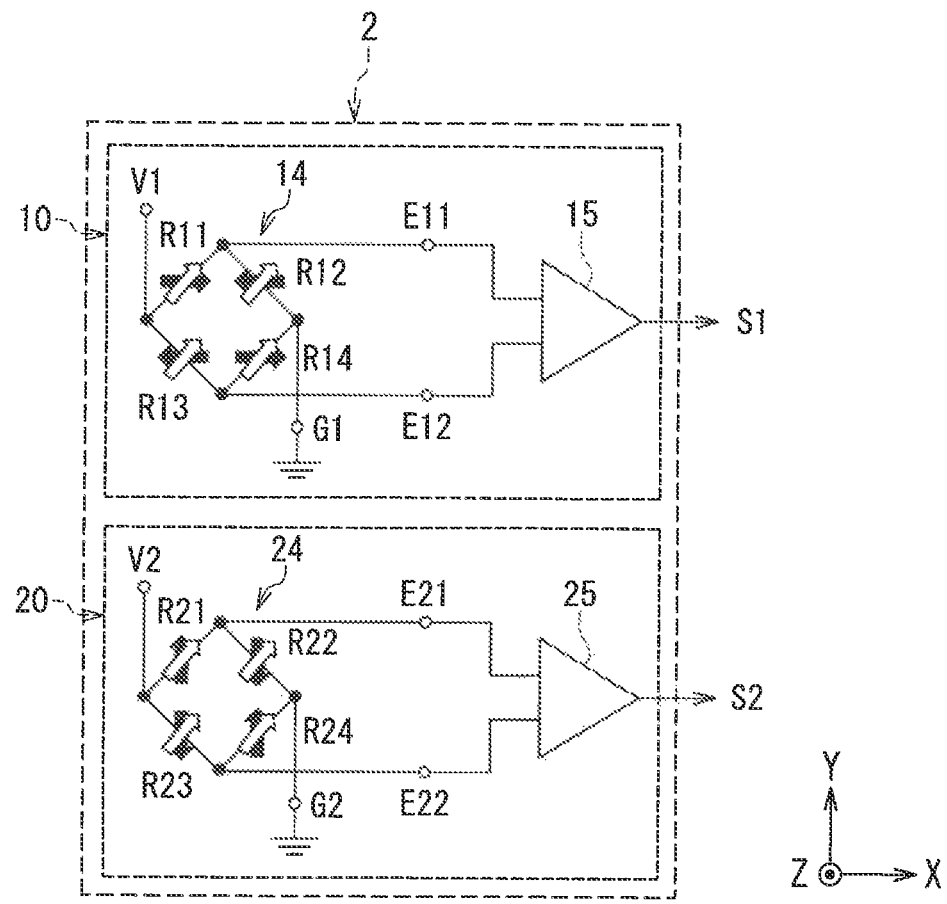
FIG. 3 is a circuit diagram illustrating the configuration of a detection signal generation unit of an angle sensor according to the first embodiment of the invention.

The configuration of the detection signal generation unit 2 will now be described in detail with reference to FIG. 3. FIG. 3 is a circuit diagram illustrating the configuration of the detection signal generation unit 2. As mentioned above, the detection signal generation unit 2 includes the first detection circuit 10 for generating the first detection signal S1 and the second detection circuit 20 for generating the second detection signal S2.

As the direction DM of the magnetic field MF rotates with a predetermined period T, the angle θ to be detected varies with the predetermined period T. In such a case, both of the first and second detection signals S1 and S2 vary periodically with a signal period equal to the predetermined period T. The second detection signal S2 differs from the first detection signal S1 in phase. In the present embodiment, the phase of the second detection signal S2 preferably differs from the phase of the first detection signal S1 by an odd number of times ¼ the signal period. However, in consideration of the production accuracy of the magnetic detection elements and other factors, the difference in phase between the first detection signal S1 and the second detection signal S2 can be slightly different from an odd number of times ¼ the signal period. The following description assumes that the phases of the first detection signal S1 and the second detection signal S2 satisfy the aforementioned preferred relationship.

The first detection circuit 10 includes a Wheatstone bridge circuit 14 and a difference detector 15. The Wheatstone bridge circuit 14 includes a power supply port V1, a ground port G1, two output ports E11 and E12, a first pair of serially connected magnetic detection elements R11 and R12, and a second pair of serially connected magnetic detection elements R13 and R14. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded. The difference detector 15 outputs a signal corresponding to the potential difference between the output ports E11 and E12 as the first detection signal S1.

The second detection circuit 20 has a circuit configuration similar to that of the first detection circuit 10. More specifically, the second detection circuit 20 includes a Wheatstone bridge circuit 24 and a difference detector 25. The Wheatstone bridge circuit 24 includes a power supply port V2, a ground port G2, two output ports E21 and E22, a first pair of serially connected magnetic detection elements R21 and R22, and a second pair of serially connected magnetic detection elements R23 and R24. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded. The difference detector 25 outputs a signal corresponding to the potential difference between the output ports E21 and E22 as the second detection signal S2.

In the present embodiment, each of the magnetic detection elements R11 to R14 and R21 to R24 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction DM of the magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer; and has a minimum resistance when the foregoing angle is 0° and a maximum resistance when the foregoing angle is 180°. In FIG. 3, the filled arrows indicate the magnetization directions of the magnetization pinned layers of the MR elements, and the hollow arrows indicate the magnetization directions of the free layers of the MR elements.

In the first detection circuit 10, the magnetization pinned layers of the MR elements included in the magnetic detection elements R11 and R14 are magnetized in the X direction, and the magnetization pinned layers of the MR elements included in the magnetic detection elements R12 and R13 are magnetized in the −X direction. In this case, the potential difference between the output ports E11 and E12 varies depending on the strength of a component in the X direction (hereinafter, "X-directional component") of the magnetic field MF. Thus, the first detection circuit 10 detects the strength of the X-directional component of the magnetic field M and generates a signal that indicates the strength as the first detection signal S1. The strength of the X-directional component of the magnetic field MF has a correspondence with the angle θ to be detected.

In the second detection circuit 20, the magnetization pinned layers of the MR elements included in the magnetic detection elements R21 and R24 are magnetized in the Y direction, and the magnetization pinned layers of the MR elements included in the magnetic detection elements R22 and R23 are magnetized in the −Y direction. In this case, the potential difference between the output ports E21 and E22 varies depending on the strength of a component in the Y direction (hereinafter, "Y-directional component") of the magnetic field MF. Thus, the second detection circuit 20 detects the strength of the Y-directional component of the magnetic field MF and generates a signal that indicates the strength as the second detection signal S2. The strength of the Y-directional component of the magnetic field MF has a correspondence with the angle θ to be detected.

In the light of the production accuracy of the MR elements or other factors, the magnetization directions of the magnetization pinned layers of the plurality of MR elements in the detection circuits 10 and 20 may be slightly different from those described above.

Figure 5:
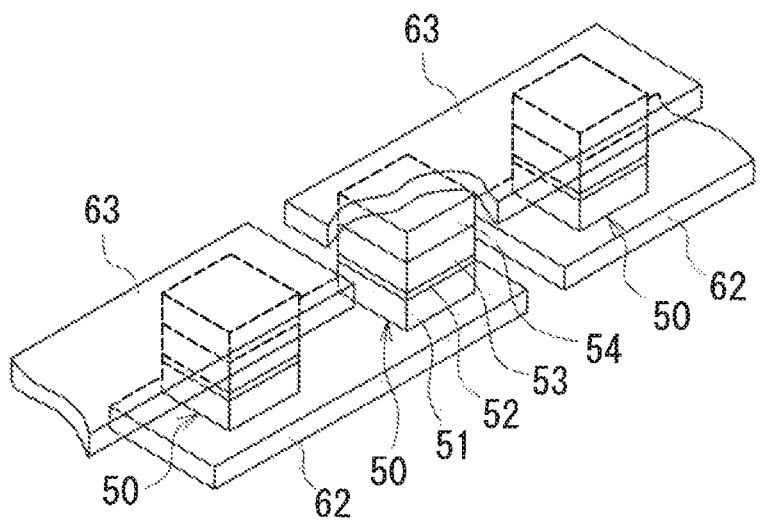
FIG. 5 is a perspective view of a portion of a magnetic detection element shown in FIG. 3.

An example of the configuration of the magnetic detection elements will now be described with reference to FIG. 5. FIG. 5 is a perspective view illustrating a portion of a magnetic detection element in the detection signal generation unit 2 shown in FIG. 3. In this example, the magnetic detection element includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 5, MR elements 50 are provided on the top surfaces of the lower electrodes 62, near opposite ends in the longitudinal direction. Each of the MR elements 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the plurality of MR elements 50 in the magnetic detection element shown in Fig, 5 are connected in series by the plurality of lower electrodes 62 and the plurality of upper electrodes 63. It should be appreciated that the layers 51 to 54 of the MR elements 50 may be stacked in art order reverse to that shown in FIG. 5.

As described previously, when the angle θ to be detected varies with the predetermined period T, the first and second detection signals S1 and S2 both vary periodically with a signal period equal to the predetermined period T. Ideally, each of the detection signals S1 and S2 should have a waveform that traces a sinusoidal curve (including a sine waveform and a cosine waveform). In actuality, however, the waveforms of the first and second signals S1 and S2 are sometimes distorted from a sinusoidal curve due to, for example, variations of the magnetization direction of the magnetization pinned layer 53 of the MR element 50 under the influence of the magnetic field MF or with other factors, or a difference of the magnetization direction of the free layer 51 of the MR element 50 from the direction DM of the magnetic field MF under the influence of a magnetic anisotropy of the free layer 51 or with other factors. In such a case, each of the detection signals S1 and S2 contains an ideal component which varies periodically in such a manner as to trace an ideal sinusoidal curve, and an error component other than the ideal component.

If the waveforms of the detection signals S1 and S2 are distorted from a sinusoidal curve, the following two kinds of errors, a first error and a second error, may occur in the detected angle value θs. The first error and the second error are errors that vary with a first period T1 and a second period T2, respectively, when the angle θ to be detected varies with a predetermined period T. The first period T1 is equal to the predetermined period T, and the second period T2 is ½ the predetermined period T.

Figure 4:
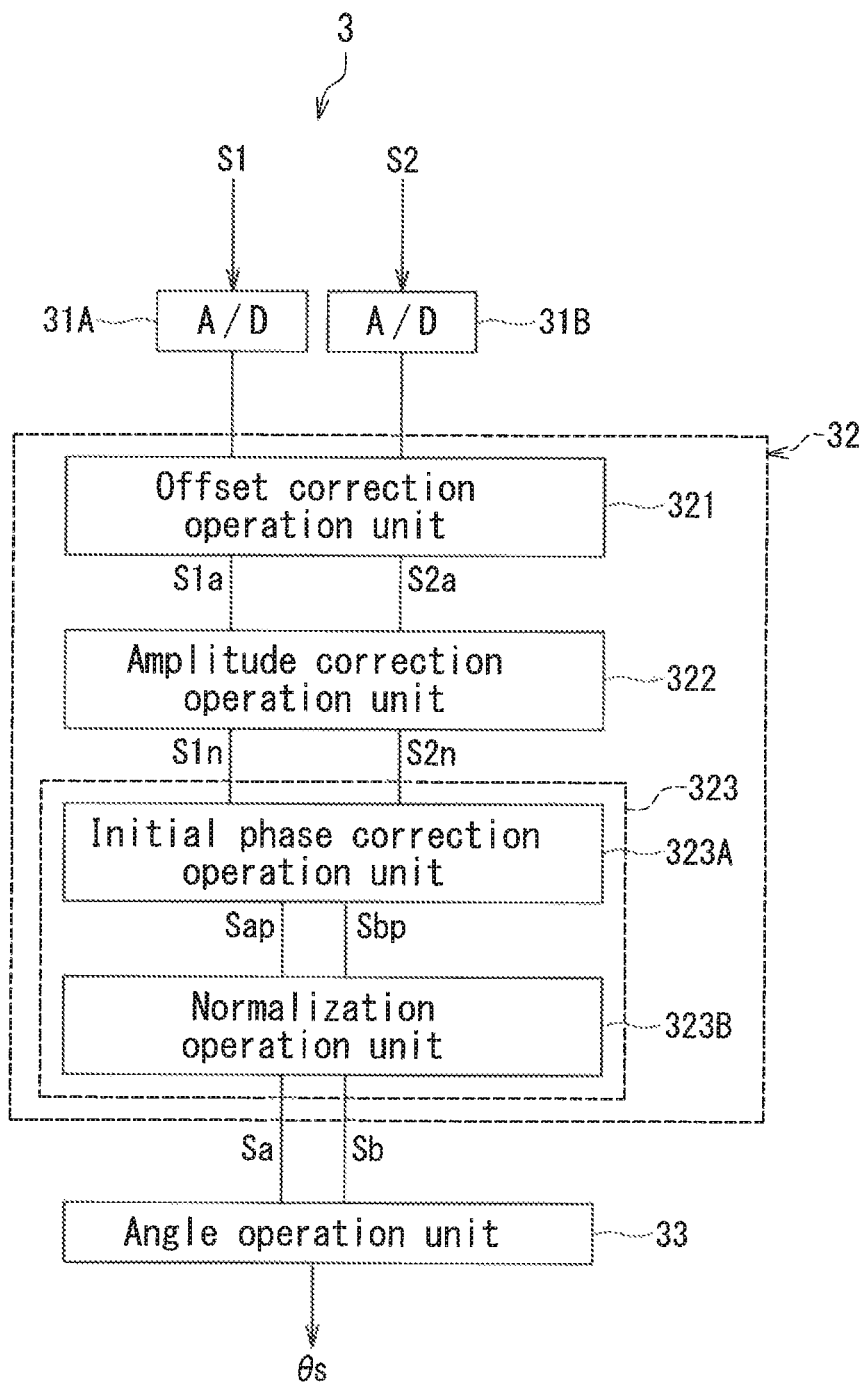
FIG. 4 is a functional block diagram illustrating the configuration of an angle detection unit of the angle sensor according to the first embodiment of the invention.

Now, components of the angle sensor 1 other than the detection signal generation unit 2 will be described with reference to FIG. 4. Aside from the detection signal generation unit 2, the angle sensor 1 further includes an angle detection unit 3. FIG. 4 is a functional block diagram illustrating the configuration of the angle detection unit 3. The angle detection unit 3 can be implemented by an application-specific integrated circuit (ASIC) or a microcomputer, for example. The angle detection unit 3 generates the detected angle value θs on the basis of a plurality of detection signals. In the present embodiment, in particular, the angle detection unit 3 generates the detected angle value θs on the basis of the first and second detection signals S1 and S2.

The angle detection unit 3 includes a signal conversion unit 32 for performing a conversion operation, and an angle operation unit 33 for performing an angle operation. The conversion operation is an operation for converting the plurality of detection signals into a first operation signal and a second operation signal to be used in the angle operation. The angle operation is an operation for calculating the detected angle value θs using the first and second operation signals.

In the present embodiment, the conversion operation particularly includes an offset correction operation, an amplitude correction operation, and a phase correction operation. The offset correction operation is an operation for applying offset correction to at least one of the plurality of detection signals. The amplitude correction operation is an operation for applying amplitude correction to at least one of the plurality of detection signals. The phase correction operation includes an initial phase correction operation and a normalization operation. The initial phase correction operation is an operation for generating a first initial operation signal and a second initial operation signal on the basis of the plurality of detection signals. The normalization operation is an operation for normalizing the amplitudes of the first initial operation signal and the second initial operation signal so as to make the first initial operation signal and the second initial operation signal into the first operation signal and the second operation signal, respectively.

The conversion operation includes an operation using at least one correction-term-containing function which contains a correction term for reducing the first error or the second error occurring in the detected angle value θs. In the present embodiment, the correction term is constituted of an operator representing any one of four arithmetic operations, and a correction parameter subsequent thereto. The effect of the correction term will now be described in brief. None of a plurality of functions used in the conversion operation that does not intend to reduce the first or second error includes any correction term. Hereinafter, a function that contains no correction term will be referred to as original function. The correction term serves to intentionally make a signal obtained by an operation using the correction-term-containing function different from a signal obtained by an operation using the original function. According to studies by the inventors of this application, it has been found that intentionally changing a signal obtained by an operation using some of a plurality of original functions in the conversion operation causes a change in the first error the second error. Taking advantage of this fact, the present embodiment reduces at least one of the first and second errors by performing the conversion operation that includes an operation using at least one correction-term-containing function.

At least one correction-term-containing function that contains a correction term for reducing the first error includes an offset correction function to apply offset correction to at least one of the detection signals. The offset correction function is used n the offset correction operation. At least one correction-term-containing function that contains a correction term for reducing the second error includes an amplitude correction function to apply amplitude correction to at least one of the detection signals, and a normalization function to apply amplitude correction to at least one of the first initial operation signal and the second initial operation signal. The amplitude correction function is used in the amplitude correction operation. The normalization function is used in the normalization operation.

To reduce the first error, the at least one correction-term-containing function includes at least one offset correction function. In such a case, the offset correction operation corresponds to the operation using the correction-term-containing function. To reduce the second error, the at least one correction-term-containing function includes at least one amplitude correction function and at least one normalization function. In such a case, the amplitude correction operation and the normalization operation correspond to the operation using the correction-term-containing function. To reduce both of the first error and the second error, the at least one correction-term-containing function includes at least one offset correction function, at least one amplitude correction function, and at least one normalization function. In such a case, the offset correction operation, the amplitude correction operation and the normalization operation correspond to the operation using the correction-term-containing function.

In the present embodiment, in particular, the plurality of detection signals are the first detection signal S1 and the second detection signal S2. The angle detection unit 3 further includes analog-to-digital converters (hereinafter, "A/D converters") 31A and 31B. The signal conversion unit 32 and the angle operation unit 33 use digital signals. The A/D converter 31A converts the first detection signal S1 to a digital signal. The A/D converter 31B converts the second detection signal S2 to a digital signal.

In the present embodiment, the signal conversion unit 32 particularly includes an offset correction operation unit 321, an amplitude correction operation unit 322, and a phase correction operation unit 323. The offset correction operation unit 321 applies the offset correction operation to both of the first detection signal S1, which is a digital signal converted by the A/D converter 31A, and the second detection signal S2, which is a digital signal converted by the A/D converter 31B, and thereby generates a first offset-corrected signal S1$a$ corresponding to the first detection signal S1 and a second offset-corrected signal S2$a$ corresponding to the second detection signal S2.

The amplitude correction operation unit 322 applies the amplitude correction operation to both of the first offset-corrected signal S1$a$ and the second offset-corrected signal S2$a$ to generate a first amplitude-corrected. signal S1$n$ corresponding to the first detection signal S1 and a second amplitude-corrected signal S2$n$ corresponding to the second detection signal S2.

The phase correction operation unit 323 includes an initial phase correction operation unit 323A and a normalization operation unit 323B. The initial phase correction operation unit 323A performs the initial phase correction operation on the basis of the first and second amplitude-corrected signals S1$n$ and S2$n$ to generate a first initial operation signal Sap and a second initial operation signal Sbp. The normalization operation unit 323B performs the normalization operation to generate a first operation signal Sa and a second operation signal Sb. In other words, the normalization operation unit 323B normalizes the amplitudes of the first initial operation signal Sap and the second initial operation signal Sbp so as to make the first initial operation signal Sap and the second initial operation signal Sbp into the first operation signal Sa and the second operation signal Sb, respectively.

Figure 6:
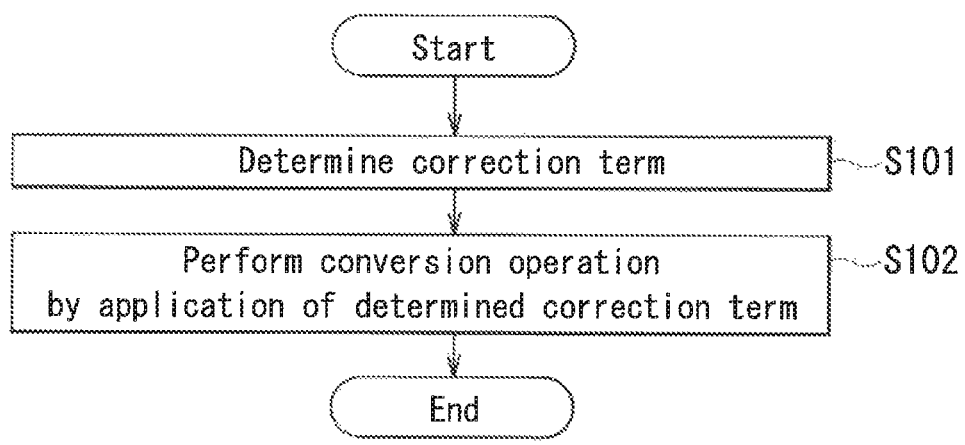
FIG. 6 is a flowchart of a correction method for use with an angle sensor according to the first embodiment of the invention.

Reference is now made to FIG. 6 to describe a correction method for use with the angle sensor 1 according to the present embodiment. FIG. 6 is a flowchart of the correction method for use with the angle sensor 1. The correction method includes a correction term determination procedure S101 to determine the correction term to be contained in the at least one correction-term-containing function, and a conversion operation procedure S102 to perform the conversion operation by application of the correction term determined by the correction term determination procedure S101 so as to reduce at least one of the first error and the second error. The correction term determination procedure S101 determines the correction term on the basis of at least one of the first error and the second error that occur in the detected angle value θs as a result of performing an operation using at least one function that is identical with the correction-term-containing function except for not containing the correction term, instead of the operation using the at least one correction-term-containing function. The aforementioned function identical with the correction-term-containing function except for not containing the correction term is identical with the aforementioned original function. The correction term determination procedure S101 is performed by a controller (not illustrated) outside the angle sensor 1 before shipment or before the use of the angle sensor 1. The conversion operation procedure S102 is performed at the time of using the angle sensor 1.

Figure 7:
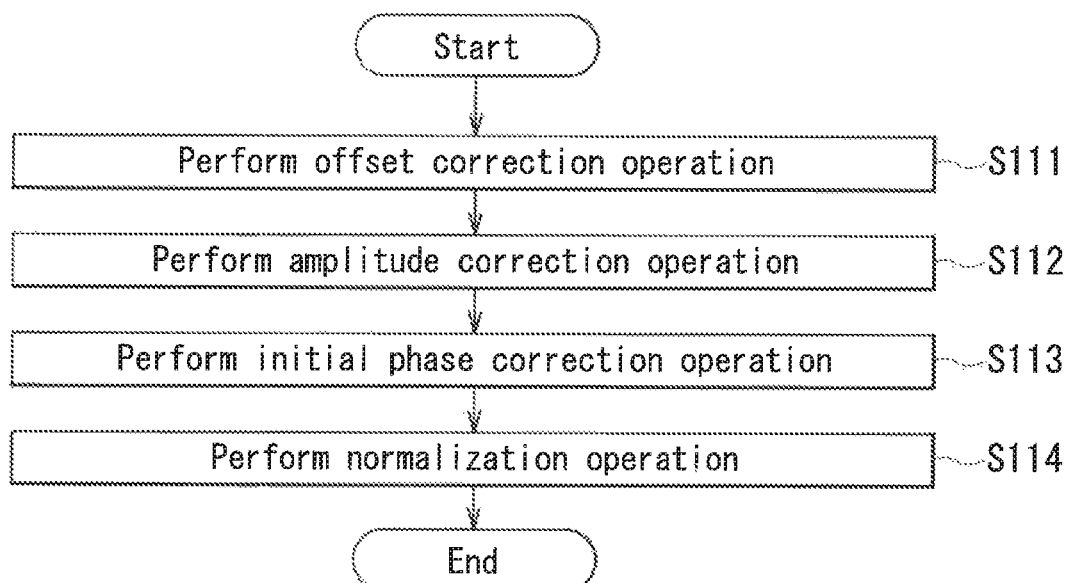
FIG. 7 is a flowchart of a conversion operation procedure in the correction method according to the first embodiment of the invention.

The conversion operation procedure S102 will be described first, and the correction term determination procedure S101 will be described later. FIG. 7 is a flowchart of the conversion operation procedure S102. The conversion operation procedure S102 includes an offset correction step S111 to perform the offset correction operation, an amplitude correction step S112 to perform the amplitude correction operation, an initial phase correction step S113 to perform the initial phase correction operation, and a normalization step S114 to perform the normalization operation. At least one of the offset correction operation to be performed in the step S111, the amplitude correction operation to be performed in the step S112, and the normalization operation to be performed in the step S114 includes an operation using at least one correction-term-containing function which contains the correction term determined by the correction term determination procedure S101 illustrated in FIG. 6. A concrete example of the conversion operation procedure S102 will now be described. In the concrete example, each of the offset correction operation, the amplitude correction operation and the normalization operation includes an operation using at least one correction-term-containing function.

The offset correction step S111 will be described first. The offset correction step S111 is performed by the offset correction operation unit 321. In the offset correction step S111, the offset correction operation unit 321 performs an offset correction operation using an offset correction function expressed by the following Eq. (1) to generate the first offset-corrected signal S1a, corresponding to the first detection signal S1. The offset correction operation unit 321 also performs an offset correction operation using an offset correction function expressed by the following Eq. (2) to generate the second offset-corrected signal S2a corresponding to the second detection signal S2.

$$S1a = S1 - \{(S1_{max} + S1_{min})/2 - C1\} \quad (1)$$

$$S2a = S2 - \{(S2_{max} + S2_{min})/2 + C2\} \quad (2)$$

In Eq. (1), $S1_{max}$ represents the maximum value of the first detection signal S1, and $S1_{min}$ represents the minimum value of the first detection signal S1. In Eq. (2), $S2_{max}$ represents the maximum value of the second detection signal S2, and $S2_{min}$ represents the minimum value of the second detection signal S2. Further, both "−C1" in Eq. (1) and "+C2" in Eq. (2) are correction terms for reducing the first error. Both C1 and C2 are correction parameters. C1 and C2 are respectively expressed by the following Eqs. (3) and (4), for example.

$$C1 = S1_{amp} \cdot \alpha \cdot \sin(t) \quad (3)$$

$$C2 = S2_{amp} \cdot \alpha \cdot \cos(t) \quad (4)$$

In Eq. (3), $S1_{amp}$ represents the amplitude of the first detection signal S1. In Eq. (4), $S2_{amp}$ represents the amplitude of the second detection signal S2. $S1_{amp}$ and $S2_{amp}$ are expressed by the following Eqs. (5) and (6), respectively.

$$S1_{amp} = (S1_{max} - S1_{min})/2 \quad (5)$$

$$S2_{amp} = (S2_{max} - S2_{min})/2 \quad (6)$$

$S1_{max}$, $S1_{min}$, $S2_{max}$ and $S2_{min}$ in. Eqs. (1), (2), (5) and (6), and α and t in Eqs. (3) and (4) are values to be determined in the course of the correction term determination procedure S101 to be described later.

In the following description, the correction term "−C1" will be referred to as the first correction term, and the correction term "+C2" will be referred to as the second correction term. As will be described later, the first error contains a first component and a second component. The first correction term is intended for reducing the first component. The second correction term is intended for reducing the second component. To reduce the first component, the correction parameter C1 takes on a value other than zero. To reduce the second component, the correction parameter C2 takes on a value other than zero.

The offset correction function expressed by Eq. (1) will also be referred to as the first correction-term-containing function, and the offset correction function expressed by Eq. (2) will also be referred to as the second correction-term-containing function. As described previously, to reduce the first error, the at least one correction-term-containing function includes at least one offset correction function. In the concrete example, the at least one correction-term-containing function includes the first and second correction-term-containing functions.

Figure 8:
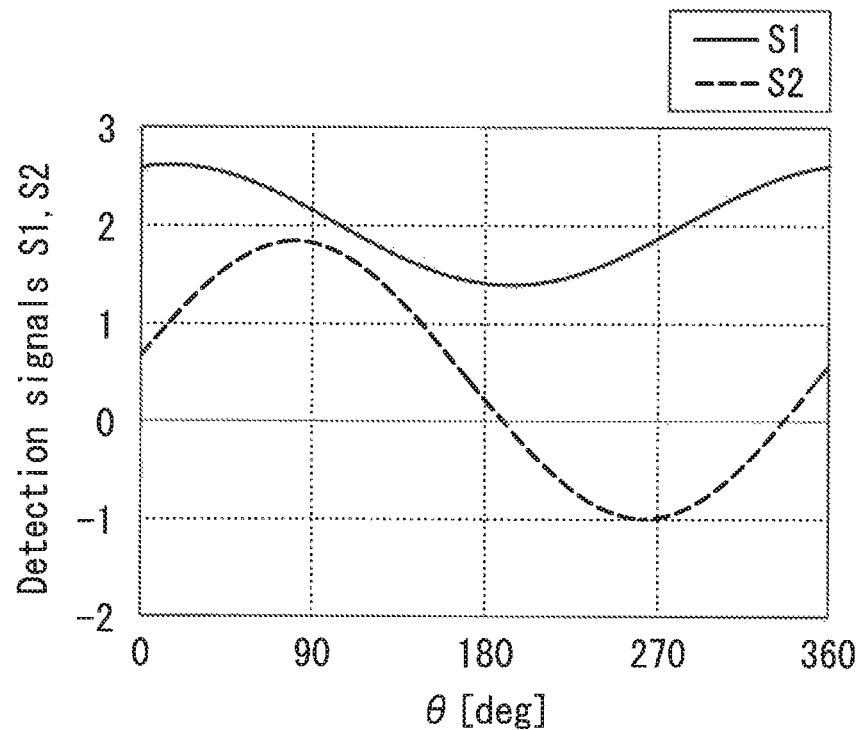
FIG. 8 is a waveform diagram illustrating an example of the waveforms of first and second detection signals.
Figure 9:
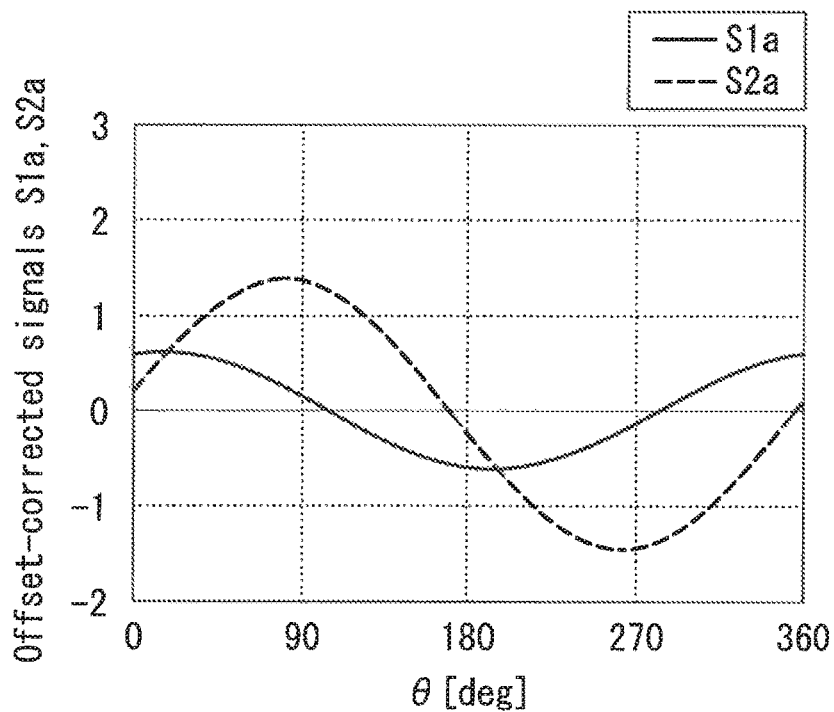
FIG. 9 is a waveform diagram illustrating an example of the waveforms of first and second offset-corrected signals.

FIG. 8 is a waveform diagram illustrating an example of the waveforms of the first and second detection signals S1 and S2. FIG. 9 is a waveform diagram illustrating an example of the waveforms of the first and second offset-corrected signals S1a and S2a. The horizontal axes in FIGS. 8 and 9 represent the angle θ to be detected. The vertical axis in FIG. 8 represents the magnitude of the first and second detection signals S1 and S2. The vertical axis in FIG. 9 represents the magnitude of the first and second offset-corrected signals S1a and S2a. Values on the vertical axes in FIGS. 8 and 9 are in arbitrary units. In FIG. 8, the solid waveform represents the waveform of the first detection signal S1, and the dashed waveform represents the waveform of the second detection signal S2. In FIG. 9, the solid waveform represents the waveform of the first offset-corrected signal S1a, and the dashed waveform represents the waveform of the second offset-corrected signal S2a.

The amplitude correction step S112 will now be described. The amplitude correction step S112 is performed by the amplitude correction operation unit 322. In the amplitude correction step S112, the amplitude correction operation unit 322 performs an amplitude correction operation using an amplitude correction function expressed by the following Eq. (7) to generate the first amplitude-corrected signal S1n corresponding to the first detection signal S1. The amplitude correction operation unit 322 also performs an amplitude correction operation using an amplitude correction function expressed by the following Eq. (8) to generate the second amplitude-corrected signal S2n corresponding to the second detection signal S2.

$$S1n = S1a/\{S1_{amp} \cdot (1 - C3)\} \quad (7)$$

$$S2n = S2a/\{S2_{amp} \cdot (1 + C3)\} \quad (8)$$

Both "−C3" in Eq. (7) and "+C3" in Eq. (8) are correction terms for reducing the second error. C3 is a correction parameter. C3 is expressed by the following Eq. (9), for example.

$$C3 = \beta \cdot \sin(s) \quad (9)$$

β and s in Eq. (9) are values to be determined in the course of the correction term determination procedure S101 to be described later.

In the following description, each of the correction terms "−C3" and "+C3" will be referred to as the third correction term. As will be described later, the second error contains a third component and a fourth component. The third correction terms are intended for reducing the third component. To reduce the third component, the correction parameter C3 takes on a value other than zero.

Each of the amplitude correction functions expressed by Eqs. (7) and (8) will also be referred to as the third correction-term-containing function. As described previously, to reduce the second error, the at least one correction-term-containing function includes at least one amplitude correction function. In the concrete example, the at least one correction-term-containing function includes the third correction-term-containing function.

Figure 10:
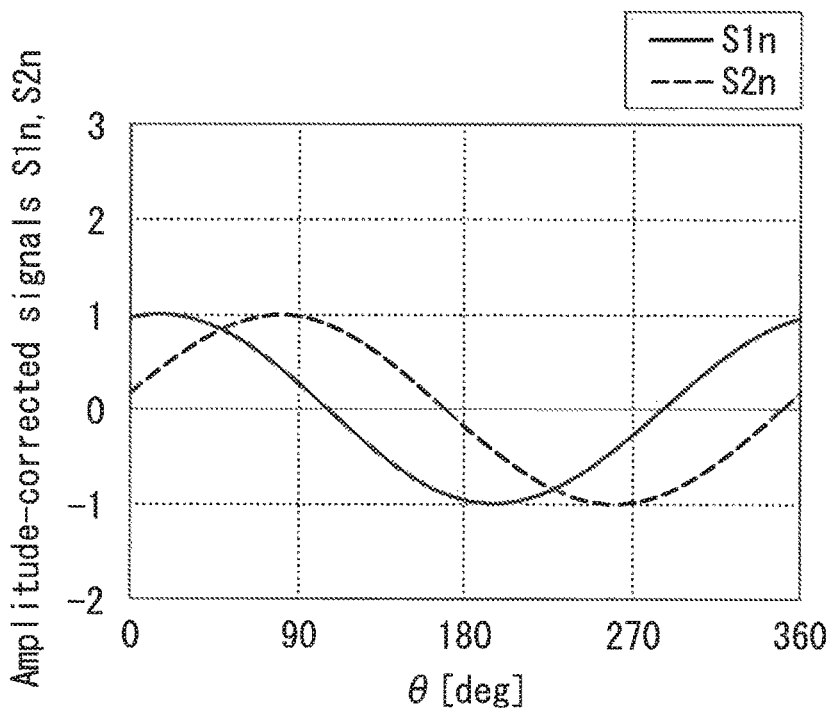
FIG. 10 is a waveform diagram illustrating an example of the waveforms of first and second amplitude-corrected signals.

FIG. 10 is a waveform diagram illustrating an example of the waveforms of the first and second amplitude-corrected signals S1n and S2n. In FIG. 10, the horizontal axis represents the angle θ to be detected, and the vertical axis represents the magnitude of the first and second amplitude-corrected signals S1n and S2n. Values on the vertical axis are in arbitrary units. In FIG. 10, the solid waveform represents the waveform of the first amplitude-corrected signal S1n, and the dashed waveform represents the waveform of the second amplitude-corrected signal S2n.

Now, the initial phase correction step S113 will be described. The initial phase correction step S113 is performed by the initial phase correction operation unit 323A of the phase correction operation unit 323. in the initial phase correction step S113, the initial phase correction operation unit 323A performs an initial phase correction operation using a function expressed by the following Eq. (10) to generate the first initial operation signal Sap. The initial phase correction operation unit 323A also performs an initial phase correction operation using a function expressed by the following Eq. (11) to generate the second initial operation signal Sbp.

$$Sap = S1n - S2n \qquad (10)$$

$$Sbp = S1n + S2n \qquad (11)$$

The meaning of the initial phase correction operation will now be described. As will be described later, the detected angle value θs is determined by calculation of the arc-tangent of two signals. It is generally required that the two signals have a phase difference of 90°. In the present embodiment, the first amplitude-corrected signal S1n ideally has a cosine waveform dependent on an angle θ, and the second amplitude-corrected signal S2n ideally has a sine waveform dependent on the angle θ. When the first amplitude-corrected signal S1n and the second amplitude-corrected signal S2n have respective desired phases, the phase difference between the first amplitude-corrected signal. S1n and the second amplitude-corrected signal. S2n is 90°. In such a case, the detected angle value θs can be determined by calculation of the arc-tangent of the first amplitude-corrected signal S1n and the second amplitude-corrected signal S2n.

However, if the phase of at least either one of the first and second amplitude-corrected signals S1n and S2n differs from the desired phase, the phase difference between the first and second amplitude-corrected signals S1n and S2n may greatly differ from 90°. In such a case, an angular error arises if the detected angle value θs is calculated in the above-described manner using the first and second amplitude-corrected signals S1n and S2n.

The initial phase correction operation is an operation for generating the first initial operation signal Sap and the second initial operation signal Sbp, which have a phase difference of 90° or near 90°, on the basis of the first and second amplitude-corrected signals S1n and S2n. In the initial phase correction operation, the phase difference between the first and second initial operation signals Sap and Sbp is 90° or near 90° regardless of the phase difference between the first and second amplitude-corrected signals S1n and S2n.

Figure 11:
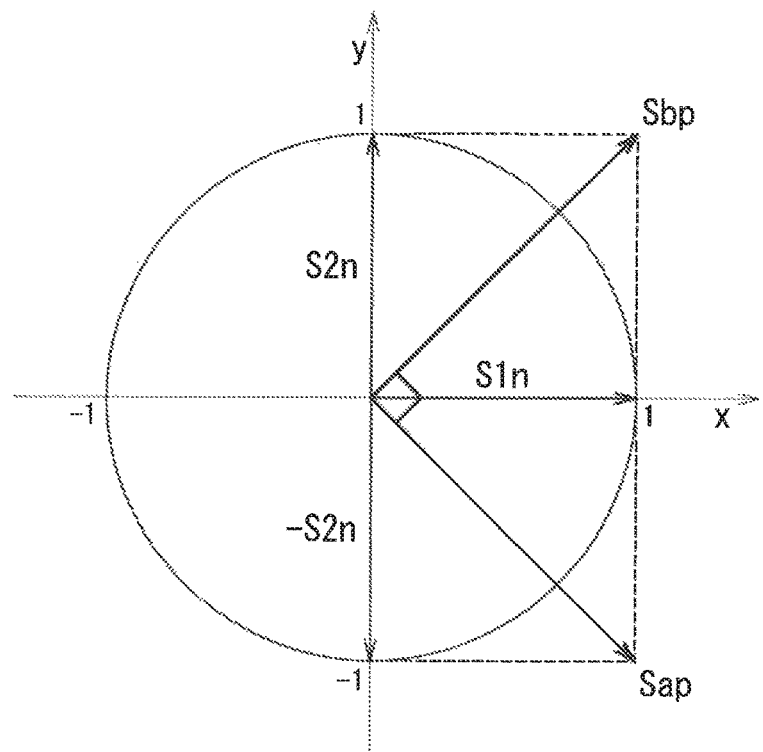
FIG. 11 is an explanatory diagram illustrating an example of the relationship between the phases of the first and second amplitude-corrected signals and the phases of first and second initial operation signals.
Figure 12:
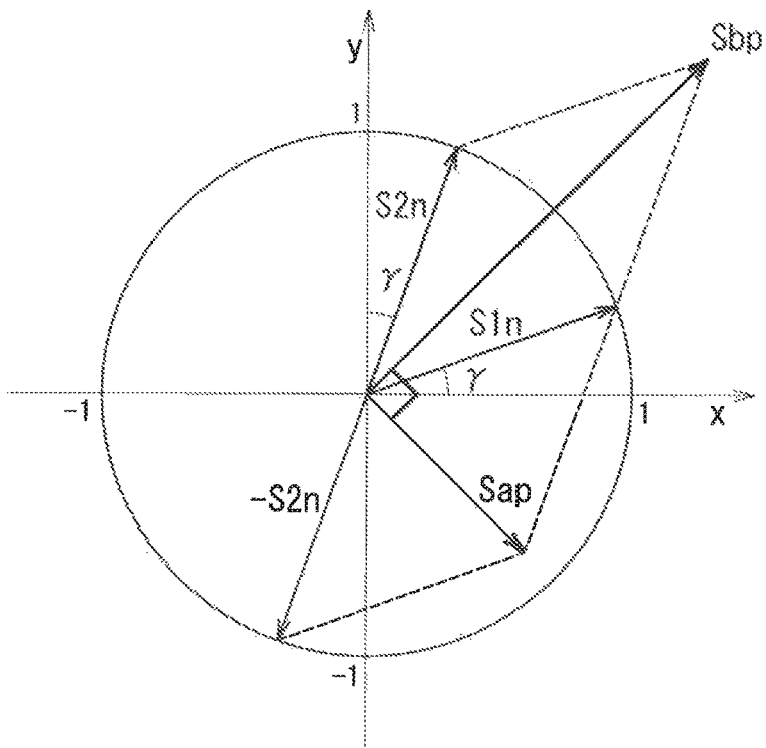
FIG. 12 is an explanatory diagram illustrating another example of the relationship between the phases of the first and second amplitude-corrected signals and the phases of the first and second initial operation signals.

FIGS. 11 and 12 are explanatory diagrams schematically illustrating the relationship between the phases of the first and second amplitude-corrected signals S1n, S2n. and the phases of the first and second initial operation signals Sap, Sbp. In FIGS. 11 and 12, the first and second amplitude-corrected signals S1n and S2n are represented by the arrows S1n and S2n, respectively, and the first and second initial operation signals Sap and Sbp are represented by the arrows Sap and Sbp, respectively. In FIGS. 11 and 12, the directions of the arrows indicate the phases of the respective signals, and the lengths of the arrows indicate the amplitudes of the respective signals. In FIGS. 11 and 12, the arrow −S2n represents the phase and amplitude of "−S2n" in Eq. (10).

FIG. 11 illustrates an example in which the first and second amplitude-corrected signals S1n and S2n have respective desired phases and have the same amplitude. In such a case, the phase difference between the first and second amplitude-corrected signals S1n and S2n is 90°.

FIG. 12 illustrates an example in which the first and second amplitude-corrected signals S1n and S2n have the same amplitude and have phases both different from the respective desired phases. In the example shown in FIG. 12, the phase of the first amplitude-corrected signal Sin is different from the desired phase by +γ. The phase of the second amplitude-corrected signal S2n is different from the desired phase by −γ. In such a case, the phase difference between the first and second amplitude-corrected signals S1n and S2n is 90°-2γ.

In both of the examples shown in FIG. 11 and FIG. 12, the phase difference between the first and second initial operation signals Sap and Sbp is 90°.

Like the example shown in FIG. 12, the amplitudes of the first and second initial operation signals Sap and Sbp are not always the same. Thus, when the initial phase correction operation is performed, the normalization operation is required in order to normalize the amplitudes of the first and second initial operation signals Sap and Sbp.

The normalization step S114 will now be described. The normalization step S114 is performed by the normalization operation unit 323B of the phase correction operation unit 323. In the normalization step S114, the normalization operation unit 323B performs a normalization operation using a normalization function expressed by the following Eq. (12) to generate the first operation signal Sa. The normalization operation unit 323B also performs a normalization operation using a normalization function expressed by the following Eq. (13) to generate the second operation signal Sb.

$$Sa = Sap / \{Sap_{amp} \cdot (1 - C4)\} \qquad (12)$$

$$Sb = Sbp / \{Sbp_{amp} \cdot (1 + C4)\} \qquad (13)$$

Both "−C4" in Eq. (12) and "+C4" in Eq. (13) are correction terms for reducing the second error. C4 is a correction parameter. C4 is expressed by the following Eq. (14), for example.

$$C4 = \beta \cdot \cos(s) \qquad (14)$$

β and s in Eq. (14) are the same as those in Eq. (9). In Eq. (12), $Sap_{amp}$ represents the amplitude of the first initial operation signal Sap. In Eq. (13), $Sbp_{amp}$ represents the amplitude of the second initial operation signal Sbp. $Sap_{amp}$ and $Sbp_{amp}$ are expressed by the following Eqs. (15) and (16), respectively.

$$Sap_{amp} = (Sap_{max} - Sap_{min})/2 \qquad (15)$$

$$Sbp_{amp} = (Sbp_{max} - Sbp_{min})/2 \qquad (16)$$

In Eq. (15), $Sap_{max}$ represents the maximum value of the first initial operation signal Sap, and $Sap_{min}$ represents the minimum value of the first initial operation signal Sap. In Eq. (16), $Sbp_{max}$ represents the maximum value of the second initial operation signal Sbp, and $Sbp_{min}$ represents the minimum value of the second initial operation signal Sbp. $Sap_{max}$, $Sap_{min}$, $Sbp_{max}$, and $Sbp_{min}$ Eqs. (15) and (16) are values to be determined in the course of the correction term determination procedure S101 to be described later.

In the following description, each of the correction terms "−C4" and "+C4" will be referred to as the fourth correction term. The fourth correction term is intended for reducing the fourth component. To reduce the fourth component, the correction parameter C4 takes on a value other than zero.

Each of the normalization functions expressed by Eqs. (12) and (13) will also be referred to as the fourth correction-term--containing function. As described previously, to reduce the second error, the at least one correction-teen-containing function includes at least one normalization function. In the concrete example, the at least one correction-term-containing function includes the fourth correction-term-containing function.

Figure 13:
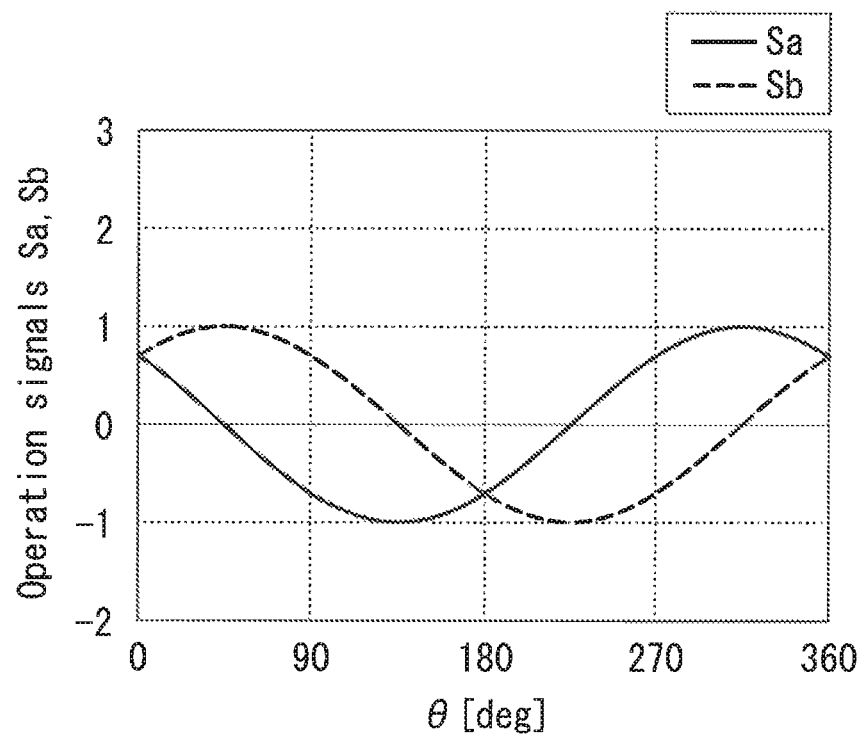
FIG. 13 is a waveform diagram illustrating an example of the waveforms of first and second operation signals.

When the angle θ to be detected varies with a predetermined period, the first operation signal Sa contains a first ideal component and a first error component other than the first ideal component, and the second operation signal Sb contains a second ideal component and a second error component other than the second ideal component. The first ideal component and the second ideal component have a phase difference of 90° or near 90°, and vary periodically in such a manner as to trace an ideal sinusoidal curve. FIG. 13 is a waveform diagram illustrating the waveforms of the first and second operation signals Sa and Sb. In FIG. 13, the horizontal axis represents the angle θ to be detected, and the vertical axis represents the magnitude of the first and second operation. signals Sa and Sb. Values on the vertical axis are in arbitrary units. In FIG. 13, the solid waveform represents the waveform of the first operation signal Sa, and the dashed waveform represents the waveform of the second operation signal Sb.

The angle operation at the angle operation unit 33 will now be described. The angle operation unit 33 calculates the detected angle value θs using the first and second operation signals Sa and Sb generated by performing the normalization step S114. More specifically, for example, the angle operation unit 33 calculates θs from the following Eq. (17). Note that "atan" in Eq. (17) represents arctangent.

$$\theta s = atan(Sb/Sa) - \phi \qquad (17)$$

In Eq. (17), φ represents the phase difference between an angle calculated from atan(Sb/Sa) and the detected angle value θs. When the first ideal component of the first operation signal Sa and the second ideal component of the second operation signal Sb have waveforms as shown in FIG. 13, φ is 45°.

If θs is in the range of 0° to less than 360°, θs in Eq. (17) has two solutions 180° different in value. Which of the two solutions of θs in Eq. (17) is the true value of θs can be determined from the combination of positive and negative signs of Sa and Sb. The angle operation unit 33 determines θs within the range of 0° to less than 360° on the basis of Eq. (17) and the foregoing determination on the combination of positive and negative signs of Sa and Sb.

A method for calculating the angular error occurring in the detected angle value θs will now be described. The angular error will be denoted by the symbol E. Calculation of the angular error E is performed under a situation in which the control unit can identify the angle θ to be detected. Examples of such a situation include where the angle θ is changed by a command from the control unit, and where the control unit can obtain information about the angle θ. Hereinafter, the angle θ identified by the control unit will be referred to as the reference angle θr, in particular. The angular error E is calculated by the following Eq. (18).

$$E = \theta s - \theta r \qquad (18)$$

Figure 14:
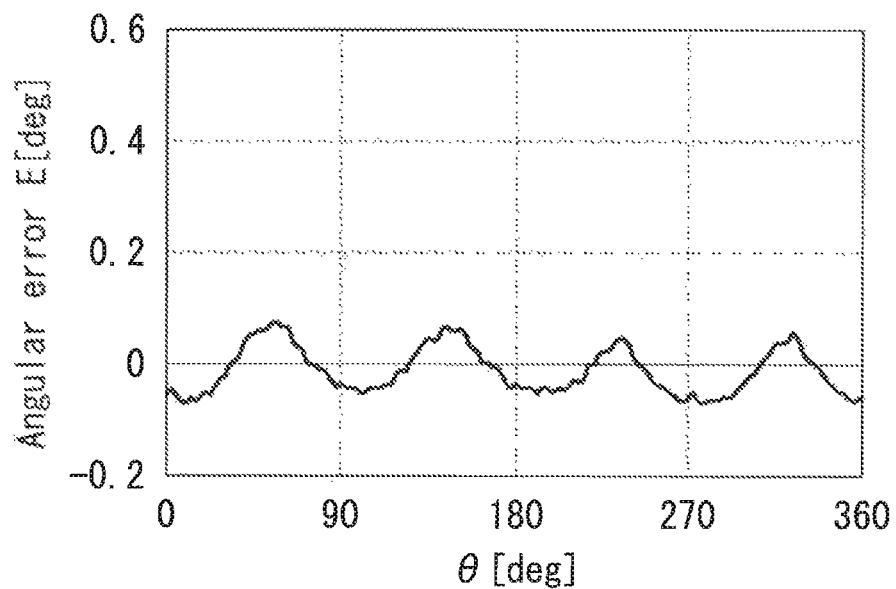
FIG. 14 is a waveform diagram illustrating an example of the waveform of an angular error.

FIG. 14 is a waveform diagram illustrating an example of the waveform of the angular error E. In FIG. 14, the horizontal axis represents the angle θ to be detected, which is equal to the the reference angle θr, and the vertical axis represents the magnitude of the angular error E. FIG. 14 shows the angular error E after the first and second errors are reduced by performing the conversion operation procedure S102.

The correction term determination procedure S101 will now be described. The correction term determination procedure S101 starts with performing a conversion operation procedure without application of any correction term. Such a procedure will hereinafter be referred to as the conversion operation procedure without correction term. The conversion operation procedure without correction term includes four steps S211 to S214 similar to the steps S111 to S114 of the conversion operation procedure S102. The conversion operation procedure without correction term is different from the procedure S102 in the following ways. For the procedure S102, at least one of the offset correction operation to be performed in the step S111, the amplitude correction operation to be performed in the step S112, and the normalization operation to be performed in the step S114 includes an operation using at least one correction-term-containing function. The conversion operation procedure without correction term involves an operation using at least one function that is identical with the correction-term-containing function except for not containing the correction term, instead of the operation using the at least one correction-term-containing function.

A concrete example of the conversion operation procedure without correction term will now be described. In this concrete example, each of the offset correction operation, the amplitude correction operation and the normalization operation includes an operation using at least one function that is identical with the correction-term-containing function except for not containing the correction term, instead of the operation using the at least one correction-term-containing function.

The step S211 will be described first. In the step S211, the first and second detection signals S1 and S2 for at least one period of the reference angle θr corresponding to the angle θ are obtained first. Then, the maximum value $S1_{max}$ and minimum value $S1_{min}$ of the first detection signal S1 are obtained from the waveform of the first detection signal S1, and the maximum value $S2_{max}$ and minimum value $S2_{min}$ of the second detection signal S2 are obtained from the waveform of the second detection signal S2. Next, instead of the operation using the first correction-term-containing function (offset correction function) expressed by Eq. (1), an operation using a function that is identical with the first correction-term-containing function except for not containing the first correction term "−C1" is performed to generate the first offset-corrected signal S1a corresponding to the first detection signal S1. To be more specific, the first offset-corrected signal S1a is generated by performing an operation using a function yielded by substituting 0 for the correction parameter C1 in Eq. (1).

Further, instead of the operation using the second correction-term-containing function (offset correction function) expressed by Eq. (2), an operation using a function that is identical with the second correction-term-containing function except for not containing the second correction term "+C2" is performed to generate the second. offset-corrected signal S2a corresponding to the second detection signal S2. To be more specific, the second offset-corrected signal S2a is generated by performing an operation using a function yielded by substituting 0 for the correction parameter C2 in Eq. (2).

Next, the step S212 will be described. In the step S212, instead of the operation using the third correction-term-containing function (amplitude correction function) expressed by Eq. (7), an operation using a function that is identical with the third correction-term-containing function expressed by Eq. (7) except for not containing the third correction term "−C3" is performed to generate the first amplitude-corrected signal Sin corresponding to the first detection signal S1. To be more specific, the first amplitude-corrected signal S1n is generated by performing an operation using a function yielded by substituting 0 for the correction parameter C3 in Eq. (7).

Further, instead of the operation using the third correction-term-containing function (amplitude correction function) expressed by Eq. (8), an operation using a function that is identical with the third correction-term-containing function expressed by Eq. (8) except for not containing the third correction term "+C3" is performed to generate the second amplitude-corrected signal S2n corresponding to the second detection signal S2. To be more specific, the second amplitude-corrected signal S2n is generated by performing an operation using a function yielded by substituting 0 for the correction parameter C3 in Eq. (8).

The details of the step S213 are the same as those of the step S113.

Next, the step S214 will be described. In the step S214, the steps S211 to S213 are repeatedly performed to obtain the first and second initial operation signals Sap and Sbp for at least one period of the reference angle θr corresponding to the angle θ. Next, the maximum value $Sap_{max}$ and minimum value $Sbp_{min}$ of the first initial operation signal Sap are obtained from the waveform of the first initial operation signal Sap, and the maximum value $Sbp_{max}$ and minimum value $Sbp_{min}$ of the second initial operation signal Sbp are obtained from the waveform of the second initial operation signal Sbp.

Next, instead of the operation using the fourth correction-term-containing function (normalization function) expressed by Eq. (12), an operation using a function that is identical with the fourth correction-term-containing function expressed by Eq. (12) except for not containing the fourth correction term "−C4" is performed to generate the first operation signal Sa. To be more specific, the first operation signal Sa is generated by performing an operation using a function yielded by substituting 0 for the correction parameter C4 in Eq. (12).

Further, instead of the operation using the fourth correction-term-containing function (normalization function) expressed by Eq. (13), an operation using a function that is identical with the fourth correction-term-containing function expressed by Eq. (13) except for not containing the fourth correction term "+C4" is performed to generate the second operation signal Sb. To be more specific, the second operation signal Sb is generated by performing an operation using a function yielded by substituting 0 for the correction parameter C4 in Eq. (13).

In the correction term determination procedure S101, the detected angle value Os is then calculated from Eq. (17) using the first and second operation signals Sa and Sb generated in the step S214. Next, the angular error (E) is calculated from Eq. (18). In the correction term determination procedure S101, the steps thereof are repeatedly performed to calculate the angular error E for at least one period of the reference angle θr corresponding to the angle θ. Then, the first to fourth correction terms are determined on the basis of the angular error E.

Figure 15:
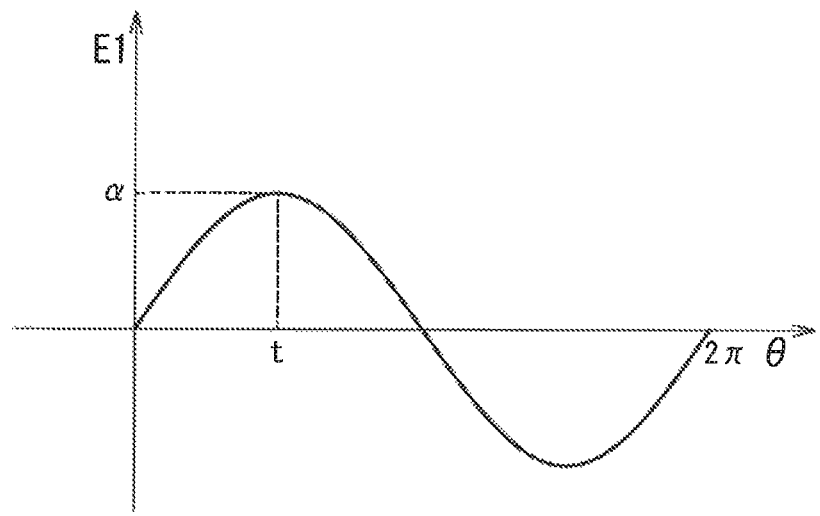
FIG. 15 is an explanatory diagram illustrating the waveform of a first error.
Figure 16:
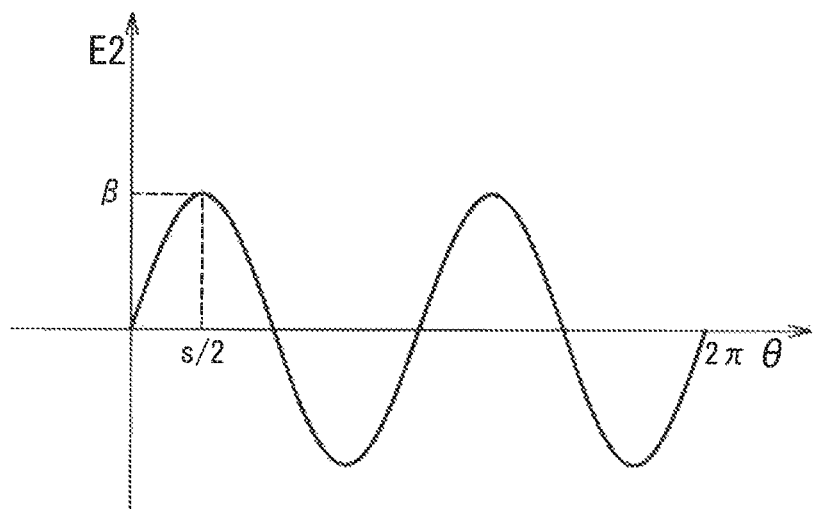
FIG. 16 is an explanatory diagram lustrating the waveform of a second error.

A method for determining the first to fourth correction terms will now be described in detail with reference to FIGS. 15 and 16. The angular error E contains the foregoing first and second errors. The first and second errors will be denoted by symbols E1 and E2, respectively. FIG. 15 is an explanatory diagram illustrating the waveform of the first error E1. FIG. 16 is an explanatory diagram illustrating the waveform of the second error E2. In FIGS. 15 and 16, the horizontal axes represent the angle θ be detected, which is equal to the reference angle θr. The vertical axes in FIG. 15 and FIG. 16 represent the magnitudes of the first error E1 and the second error E2, respectively. In FIGS. 15 and 16, the angle θ and the first and second errors E1 and E2 are in radians.

The first error E1 will be defined as $\alpha \cdot \cos(\theta - t)$, and the second error E2 as $\beta \cdot \cos\{2(\theta - s/2)\}$, where α corresponds to the amplitude of the first error E1, t corresponds to the phase of the first error E1, β corresponds to the amplitude of the second error E2, and s corresponds to the phase of the second error E2. The values of α and β are zero or more. In the correction term determination procedure S101, the steps S211 to S214 are performed as described above to determine the angular error E for at least one period of the reference angle θr. Then, the first error E1 and the second error E2 contained in the angular error E for the at least one period of the reference angle θr are determined. This can be accomplished by, for example, applying a Fourier transform to the angular error E for the at least one period to determine α, t, β, and s.

In the correction term determination procedure S101, the first and second correction terms "−C1" and "+C2" are determined on the basis of the amplitude and phase of the first error E1. More specifically, α and t are determined as described above, the correction parameter C1 is determined from Eq. (3) using α and t, and the correction parameter C2 is determined from Eq. (4) using α and t. The first and second correction terms "−C1" and "+C2" are thereby determined. If the first error E1 does not occur, then α=0, and consequently C1=C2=0.

In the correction term determination procedure S101, the third correction terms "−C3" and "+C3" and the fourth correction terms "−C4" and "+C4" are determined on the basis of the amplitude and phase of the second error E2. More specifically, β and s are determined as described above, the correction parameter C3 is determined from Eq. (9) using β and s, and the correction parameter C4 is determined from Eq. (14) using β and s. The third correction terms "−C3" and "+C3" and the fourth correction terms "−C4" and "+C4" are thereby determined. If the second error E2 does not occur, then β=0, and consequently C3=C4=0.

Figure 17:
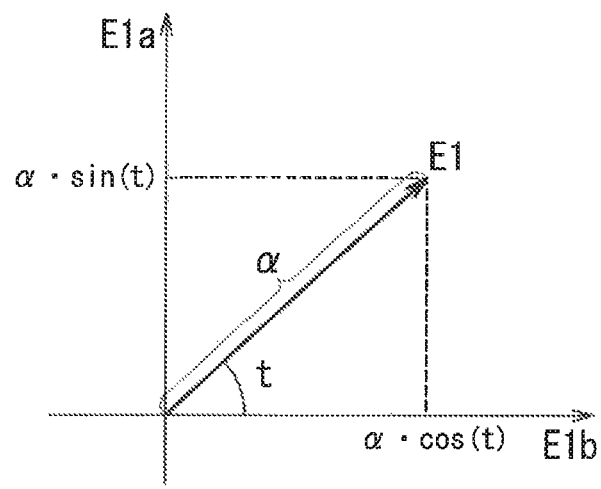
FIG. 17 is an explanatory diagram illustrating a method of determining first and second correction terms on the basis of the amplitude and phase of the first error.

Now, a description will be given of the relationship between the first error E1 and the first and second correction terms. The first error E1 contains a first component E1a and a second component E1b. The first component E1a and the second component E1b have a phase difference of 90°. In other words, the phase difference between the first component E1a and the second component E1b is equivalent to ¼ the first period T1. FIG. 17 is an explanatory diagram schematically illustrating the first error E1. In FIG. 17, the vertical axis represents the amplitude of the first component E1a, and the horizontal axis represents the amplitude of the second component E1b. In FIG. 17 the first error E1 defined by any given α and t is represented by the arrow labeled E1. The length of the arrow E1 corresponds to α, and the direction of the arrow E1 corresponds to t. As shown in FIG.

17, the amplitude of the first component E1a is α·sin(t), and the amplitude of the second component E1b is α·cos(t).

The amplitude of the first component E1a varies depending on the value of the correction parameter C1 of the first correction term "−C1". Thus, it is possible to reduce the first component E1a of the first error E1 by adjusting the value of the correction parameter C1 in accordance with the amplitude of the first component E1a determined by performing the above-described steps S211 to S214. To be more specific, the first component E1a can be reduced by, as shown by Eq. (3), using the product of the amplitude α·sin(t) of the first component E1a and the amplitude $S1_{amp}$ of the first detection signal S1 as the correction parameter C1.

The amplitude of the second component E1b varies depending on the value of the correction parameter C2 of the second correction term "+C2". Thus, it is possible to reduce the second component E1b of the first error E1 by adjusting the value of the correction parameter C2 in accordance with the amplitude of the second component E1b determined by performing the above-described steps S211 to S214. To be more specific, the second component E1b can be reduced by, as shown by Eq. (4), using the product of the amplitude α·cos(t) of the second component E1b and the amplitude $S2_{amp}$ of the second detection signal S2 as the correction parameter C2.

Figure 18:
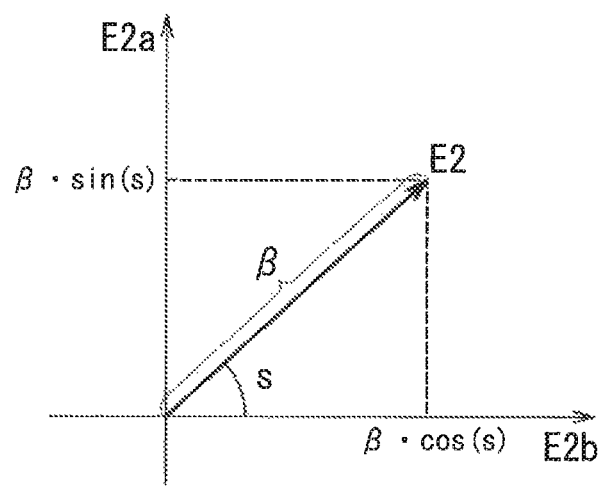
FIG. 18 is an explanatory diagram illustrating a method of determining third and fourth correction terms on the basis of the amplitude and phase of the second error.

Next, the relationship between the second error E2 and the third and fourth correction terms will be described. The second error E2 contains a third component E2a and a fourth component E2b. The third component E2a and the fourth component E2b have a phase difference of 45°. In other words, the phase difference between the third component E2a and the fourth component E2b is equivalent to ¼ the second period T2. FIG. 18 is an explanatory diagram schematically illustrating the second error E2. In FIG. 18, the vertical axis represents the amplitude of the third component E2a, and the horizontal axis represents the amplitude of the fourth component E2b. In FIG. 18 the second error E2 defined by any given β and s is represented by the arrow labeled. E2. The length of the arrow E2 corresponds to β, and the direction of the arrow E2 corresponds to s. As shown in FIG. 18, the amplitude of the third component E2a is β·sin(s), and the amplitude of the fourth component E2b is β·cos(s).

The amplitude of the third component E2a varies depending on the value of the correction parameter C3 of the third correction terms "−C3" and "+C3". Thus, it is possible to reduce the third component E2a of the second error E2 by adjusting the value of the correction parameter C3 in accordance with the amplitude of the third component E2a determined by performing the above-described steps S211 to S214. To be more specific, the third component E2a can be reduced by, as shown by Eq. (9), using the amplitude β·sin(s) of the third component E2a as the correction parameter C3.

The amplitude of the fourth component E2b varies depending on the value of the correction parameter C4 of the fourth correction terms "−C4" and "+C4". Thus, it is possible to reduce the fourth component E2b of the second error E2 by adjusting the value of the correction parameter C4 in accordance with the amplitude of the fourth component E2b determined by performing the above-described steps S211 to S214. To be more specific, the fourth component E2b can be reduced by, as shown by Eq. (14), using the amplitude β·cos(s) of the fourth component E2b as the correction parameter C4.

As has been described, according to the angle sensor 1 and the correction method for use therewith in the present embodiment, the conversion operation includes an operation using at least one correction-term-containing function which contains a correction term for reducing the first error E1 or the second error E2 occurring in the detected angle value θs. In the present embodiment, the first correction term "−C1" is particularly intended for reducing the first component E1a of the first error E1. The second correction term "+C2" is particularly intended for reducing the second component E1b of the first error E1. The third correction terms "−C3" and "+C3" are intended for reducing the third component E2a of the second error E2. The fourth correction terms "−C4" and "+C4" are intended for reducing the fourth component E2b of the second error E2.

One of causes of occurrence of the first and second errors E1 and E2 is distortion of the waveform of each of the first and second detection signals S1 and S2. A conceivable method for reducing the first and second errors E1 and E2 is to correct the first and second detection signals S1 and S2 so as to reduce the distortion of the waveforms of the first and second detection signals S1 and S2. To be more specific, for example, a Fourier transform may be applied to the waveforms of the first and second detection signals S1 and S2 to cancel out the error components contained in the first and second detection signals S1 and S2 on the basis of the results. Thus, reducing the distortion of the waveforms of the first and second detection signals S1 and S2 requires complicated operations.

In contrast, according to the present embodiment, reduction of the first error E1 and the second error E2 is made possible by operations using the first to fourth correction-term-containing functions which contain the first to fourth correction terms, respectively, instead of correcting the first and second detection signals S1 and S2 so as to reduce the distortion of the waveforms of the first and second detection signals S1 and S2. Each of the first to fourth correction terms is constituted of an operator representing any one of four arithmetic operations, and a correction parameter subsequent thereto. The present embodiment thus enables reduction of the first and second errors E1 and E2 with simple operation.

In the present embodiment, the first and second offset-corrected signals S1a and S2a are generated from Eqs. (1) and (2) each of which includes a correction term. Thus, in most cases, each of the signals S1a and S2a has a slight offset. In the present embodiment, the first and second amplitude-corrected signals S1n and S2n are generated from Eqs. (7) and (8) each of which includes a correction term. Thus, in most cases, the amplitudes of the first and second amplitude-corrected signals S1n and S2n are slightly different from each other, and as a result, the phase difference between the first initial operation signal Sap and the second initial operation signal Sbp slightly deviates from 90°. Further, in the present embodiment, the first and second operation signals Sa and Sb are generated from Eqs. (12) and (13) each of which includes a correction term Thus, in most cases, the amplitudes of the first and second operation signals Sa and Sb are slightly different from each other. In this way, according to the present embodiment, a signal obtained by an operation using the correction-term-containing function is intentionally made different from a signal obtained by an operation using the original function. This is inconceivable from a conventional general correction point of view, because the difference becomes a cause of an angular error. However, as has been described, the present embodiment rather enables reduction of the first and second errors E1 and E2.

[Second Embodiment]

Figure 19:
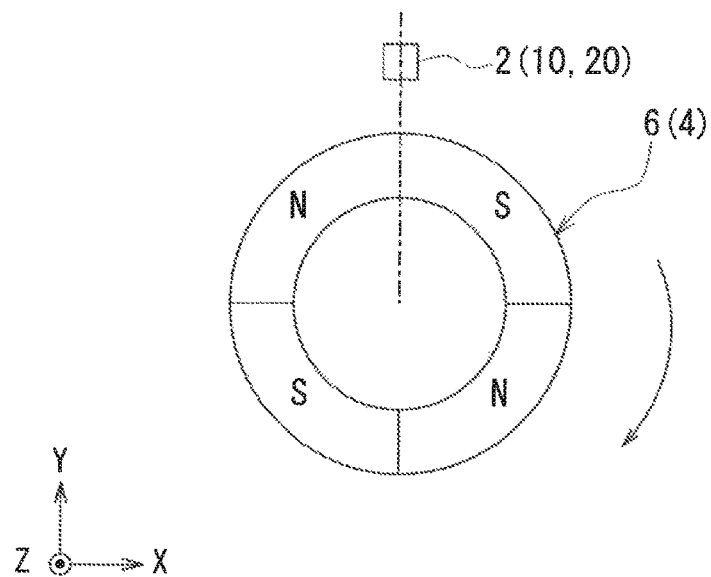
FIG. 19 is an explanatory diagram illustrating the general configuration of an angle sensor system according to a second embodiment of the invention.

An angle sensor system according to a second embodiment of the invention will now be described with reference to FIG. 19. FIG. 19 is an explanatory diagram illustrating the general configuration of the angle sensor system according to the second embodiment. As in the first embodiment, the physical information generation unit 4 in the second embodiment is a magnetic field generation unit for generating a magnetic field as physical information. As an example of the magnetic field generation unit, FIG. 19 shows a magnet 6 including one or more pairs of N and S poles arranged alternately in an annular shape. In the example shown in FIG. 19, the plane of the drawing of FIG. 19 is an XY plane, and a direction perpendicular to the plane is the Z direction.

The angle sensor 1 according to the present embodiment detects the direction of a magnetic field generated from the outer circumference of the magnet 6. The relative position of the magnet 6 with respect to the angle sensor 1 changes in such a way as to rotate about a central axis. This is accomplished by a rotation of the magnet 6 about a predetermined central axis parallel to the Z direction in response to a rotational movement of a moving object (not illustrated). The direction of a magnetic field to be detected by the angle sensor 1 rotates about the central axis (the Z direction) with changes in the relative position of the magnet 6 with respect to the angle sensor 1. In the example shown in FIG. 19, the magnet 6 rotates clockwise, and the direction of the magnetic field to be detected by the angle sensor 1 rotates counterclockwise.

The detection signal generation unit 2 of the angle sensor 1 may include a first detection circuit 10 and a second detection circuit 20 as in the first embodiment. The first and second detection circuits 10 and 20 are located in the same position in the direction of rotation of the magnet 6.

The remainder of configuration, function and effects of the second embodiment are similar to those of the first embodiment.

[Third Embodiment]

Figure 20:
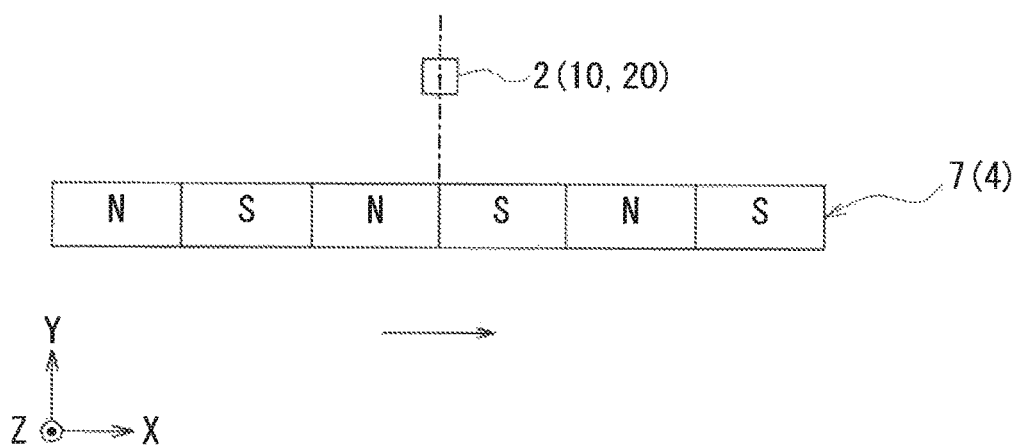
FIG. 20 is an explanatory diagram illustrating the general configuration of an angle sensor system according to a third embodiment of the invention.

An angle sensor system according to a third embodiment of the invention will now be described with reference to FIG. 20. FIG. 20 is an explanatory diagram illustrating the general configuration of the angle sensor system according the third embodiment. As in the first embodiment, the physical information generation unit 4 in the third embodiment is a magnetic field generation unit for generating a magnetic field as physical information. As an example of the magnetic field generation unit, FIG. 20 shows a magnet 7 including a plurality of pairs of N and S poles arranged alternately in a liner configuration. In the example shown in FIG. 20, the plane of the drawing of FIG. 20 is an XY plane, and a direction perpendicular to the plane is the Z direction. The N and S poles of the magnet 7 are aligned in the X direction.

The angle sensor 1 according to the present embodiment detects the direction of a magnetic field generated from the periphery of the magnet 7. The relative position of the magnet 7 with respect to the angle sensor 1 changes in a linear fashion. This is accomplished by a linear movement of either one of the angle sensor 1 and the magnet 7 in the X direction in response to the movement of a moving object (not illustrated). The direction of the magnetic field to be detected by the angle sensor 1 rotates about the Z axis with changes in the relative position of the magnet 7 with respect to the angle sensor 1.

The detection signal generation unit 2 of the angle sensor 1 may include a first detection circuit 10 and a second detection circuit 20 as in the first embodiment. The first and second detection circuits 10 and 20 are located in the same position in the X direction.

The remainder of configuration, function and effects of the third embodiment are similar to those of the first embodiment.

The present invention is not limited to the foregoing embodiments, and various modifications may be made thereto. For example, in the conversion operation procedure S102, the offset correction step S111 and the amplitude correction step S112 may be performed in reverse order to that in the foregoing embodiments. In the correction term determination procedure S101, the step S211 and the step S212 may be performed in reverse order to that in the foregoing embodiments. In such a case, the amplitude correction operation unit 322 applies the amplitude correction operation to each of the first and second detection signals S1 and S2 to generate the first and second amplitude-corrected signals. The offset correction operation unit 321 applies the offset correction operation to each of the first and second amplitude-corrected signals to generate the first and second offset-corrected signals. The initial phase correction operation unit 323A of the phase correction operation unit 323 performs the initial phase correction operation on the basis of the first and second offset-corrected signals to generate the first and second initial operation signals Sap and Sbp.

The at least one correction-term-containing function may include at least one function that contains a correction term to intentionally generate an offset in at least one of the first initial operation signal Sap, the second initial operation signal Sbp, the first operation signal Sa, and the second operation signal Sb. The correction term contained in such at least one function is to reduce the first error E1.

The operator used in each correction term may be an operator indicating multiplication or division. An optimal value of the correction parameter in each correction term is determined in accordance with the type of the operator.

The present invention is applicable not only to magnetic angle sensors but to all types of angle sensors including, for example, optical angle sensors, and to all types of angle sensor systems. In the case of an angle sensor system that includes an optical angle sensor and an optical scale, the physical information is optical information that varies depending on the relative position of the optical scale with respect to the angle sensor. In such a case, the angle to be detected is, for example, an angle that represents the relative position of the optical scale with respect to the angle sensor with one pitch of the optical scale as 360°.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. An angle sensor comprising:
    a detection signal generation circuit for generating a plurality of detection signals each having a correspondence with an angle to be detected; and
    an angle detection circuit for generating a detected angle value on the basis of the plurality of detection signals, the detected angle value having a correspondence with the angle to be detected, wherein
    the angle detection circuit comprises:
        a signal conversion circuit for performing a conversion operation to convert the plurality of detection signals into a first operation signal and a second operation signal to be used in an angle operation to calculate the detected angle value; and an angle operation circuit for performing the angle operation using the first and second operation signals, the conversion operation includes an operation using at least one correction-term-containing function which contains a correction term for reducing a first error or a second error occurring in the detected angle value, and the first error and the second error are errors that vary with a first period and a second period, respectively, when the angle to be detected varies with a predetermined period, the first period being equal to the predetermined period, the second period being ½ the predetermined period.

2. The angle sensor according to claim 1, wherein the at least one correction-term-containing function includes at least one offset correction function to apply offset correction to at least one of the plurality of detection signals, and the correction term contained in the at least one offset correction function is intended for reducing the first error.

3. The angle sensor according to claim 1, wherein the at least one correction-term-containing function includes at least one amplitude correction function to apply amplitude correction to at least one of the plurality of detection signals, and the correction term contained in the at least one amplitude correction function is intended for reducing the second error.

4. The angle sensor according to claim 1, wherein the conversion operation includes: an operation for generating a first initial operation signal and a second initial operation signal on the basis of the plurality of detection signals; and a normalization operation for normalizing amplitudes of the first initial operation signal and the second initial operation signal so as to make the first initial operation signal and the second initial operation signal into the first operation signal and the second operation signal, respectively, when the angle to be detected varies with a predetermined period, the first operation signal contains a first ideal component and a first error component other than the first ideal component, and the second operation signal contains a second ideal component and a second error component other than the second ideal component, the first ideal component and the second ideal component vary periodically in such a manner as to trace an ideal sinusoidal curve, the at least one correction-term-containing function includes at least one normalization function to be used in the normalization operation to correct the amplitude of at least one of the first initial operation signal and the second initial operation signal, and the correction term contained in the at least one normalization function is intended for reducing the second error.

5. The angle sensor according to claim 1, wherein the first error contains a first component and a second component, the first component and the second component has a phase difference equivalent to ¼ the first period, and the at least one correction-term-containing function includes a first correction-term-containing function which contains a first correction term for reducing the first component, and a second correction-term-containing function which contains a second correction term for reducing the second component.

6. The angle sensor according to claim 1, wherein the second error contains a third component and a fourth component, the third component and the fourth component has a phase difference equivalent to ¼ the second period, and the at least one correction-term-containing function includes a third correction-term-containing function which contains a third correction term for reducing the third component, and a fourth correction-term-containing function which contains a fourth correction term for reducing the fourth component.

7. The angle sensor according to claim 1, wherein the angle to be detected is an angle that a direction of a magnetic field in a reference position forms with respect to a reference direction.

8. A correction method for use with an angle sensor, the angle sensor including:

a detection signal generation circuit for generating a plurality of detection signals each having a correspondence with an angle to be detected; and an angle detection circuit for generating a detected angle value on the basis of the plurality of detection signals, the detected angle value having a correspondence with the angle to be detected, wherein the angle detection circuit includes:

a signal conversion circuit for performing a conversion operation to convert the plurality of detection signals into a first operation signal and a second operation signal to be used in an angle operation to calculate the detected angle value; and an angle operation circuit for performing the angle operation using the first and second operation signals, the conversion operation includes an operation using at least one correction-teem-containing function which contains a correction term for reducing a first error or a second error occurring in the detected angle value, and the first error and the second error are errors that vary with a first period and a second period, respectively, when the angle to be detected varies with a predetermined period, the first period being equal to the predetermined period, the second period being ½ the predetermined period, the correction method comprising:

a correction term determination procedure to determine the correction term to be contained in the at least one correction-term-containing function; and a conversion operation procedure to perform the conversion operation by application of the correction term determined by the correction term determination procedure so as to reduce at least one of the first error and the second error, wherein the correction term determination procedure determines the correction term on the basis of at least one of the first error and the second error that occur in the detected angle value as a result of performing an operation using at least one function that is identical with the correction-term-containing function except for not containing the correction term, instead of the operation using the at least one correction-term-containing function.

9. The correction method according to claim 8, wherein
the at least one correction-term-containing function includes at least one offset correction function to apply offset correction to at least one of the plurality of detection signals, and
the correction term contained in the at least one offset correction function is intended for reducing the first error.

10. The correction method according to claim 8, wherein
the at least one correction-term-containing function includes at least one amplitude correction function to apply amplitude correction to at least one of the plurality of detection signals, and
the correction term contained in the at least one amplitude correction function is intended for reducing the second error.

11. The correction method according to claim 8, wherein
the conversion operation includes: an operation for generating a first initial operation signal and a second initial operation signal on the basis of the plurality of detection signals; and a normalization operation for normalizing amplitudes of the first initial operation signal and the second initial operation signal so as to make the first initial operation signal and the second initial operation signal into the first operation signal and the second operation signal, respectively,
when the angle to be detected varies with a predetermined period, the first operation signal contains a first ideal component and a first error component other than the first ideal component, and the second operation signal contains a second ideal component and a second error component other than the second ideal component,
the first ideal component and the second ideal component vary periodically in such a manner as to trace an ideal sinusoidal curve,
the at least one correction-term-containing function includes at least one normalization function to be used in the normalization operation to correct the amplitude of at least one of the first initial operation signal and the second initial operation signal, and
the correction term contained in the at least one normalization function is intended for reducing the second error.

12. The correction method according to claim 8, wherein
the first error contains a first component and a second component,
the first component and the second component have a phase difference equivalent to ¼ the first period,
the at least one correction-term-containing function includes a first correction-term-containing function which contains a first correction term for reducing the first component, and a second correction-term-containing function which contains a second correction term for reducing the second component, and
the correction term determination procedure determines the first and second correction terms on the basis of the amplitude and phase of the first error that occurs in the detected angle value as a result of performing an operation using a function that is identical with the first correction-term-containing function except for not containing the first correction term and an operation using a function that is identical with the second correction-term-containing function except for not containing the second correction term, instead of an operation using the first correction-term-containing function and an operation using the second correction-term-containing function.

13. The correction method according to claim 8, wherein
the second error contains a third component and a fourth component,
the third component and the fourth component have a phase difference equivalent to ¼ the second period,
the at least one correction-term-containing function includes a third correction-term-containing function which contains a third correction term for reducing the third component, and a fourth correction-term-containing function which contains a fourth correction term for reducing the fourth component, and
the correction term determination procedure determines the third and fourth correction terms on the basis of the amplitude and phase of the second error that occurs in the detected angle value as a result of performing an operation using a function that is identical with the third correction-term-containing function except for not containing the third correction term and an operation using a function that is identical with the fourth correction-term-containing function except for not containing the fourth correction term, instead of an operation using the third correction-term-containing function and an operation using the fourth correction-term-containing function.

14. The correction method according to claim 8, wherein the angle to be detected is an angle that a direction of a magnetic field in a reference position forms with respect to a reference direction.

15. An angle sensor system comprising:
the angle sensor according to claim 1; and
a physical information generator for generating physical information having a correspondence with the angle to be detected,
wherein the detection signal generation circuit is configured to detect the physical information to generate the plurality of detection signals.

16. The angle sensor system according to claim 15, wherein the
physical information generator is a magnetic field generator for generating a magnetic field as the physical information, and
the angle to be detected is an angle that a direction of the magnetic field in a reference position forms with respect to a reference direction.

17. The angle sensor system according to claim 15, wherein the physical information generator is configured to change its relative position with respect to the angle sensor so that the angle to be detected changes.

18. The angle sensor system according to claim 17, wherein the relative position of the physical information generator with respect to the angle sensor changes in such a way as to rotate about a central axis.

19. The angle sensor system according to claim 17, wherein the relative position of the physical information generator with respect to the angle sensor changes in a linear fashion.

* * * * *